(No Model.)
J. BROADLEY.
NUT LOCK.
No. 481,344. Patented Aug. 23, 1892.
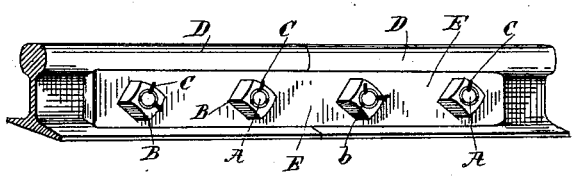
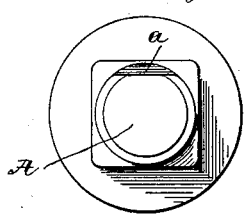
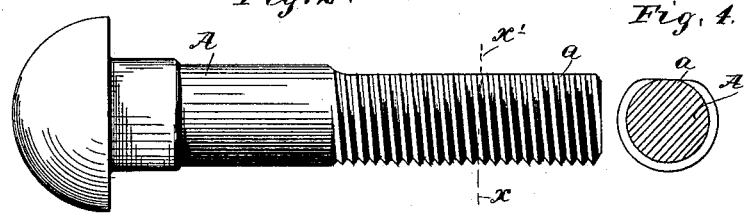
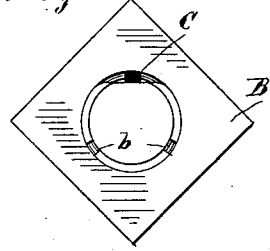
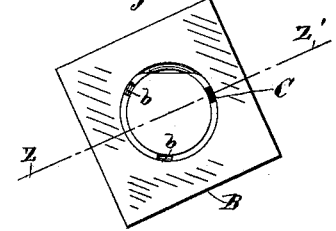
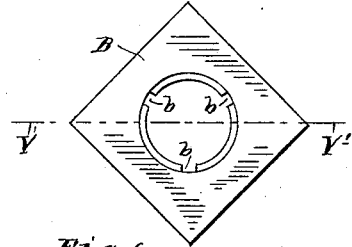
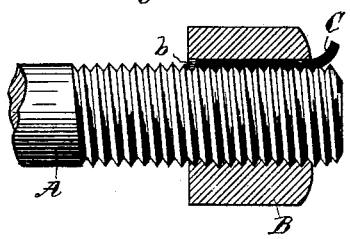
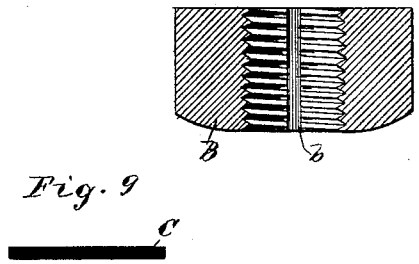
Witnesses.
Emma F. Elmore
A. H. Opsahl.
Inventor.
Joseph Broadley
By his Attorney
Jas. F. Williamson

UNITED STATES PATENT OFFICE.

JOSEPH BROADLEY, OF ELKHORN, CANADA.

NUT-LOCK.

SPECIFICATION forming part of Letters Patent No. 481,344, dated August 23, 1892.

Application filed June 10, 1892. Serial No. 436,184. (No model.)

*To all whom it may concern:*

Be it known that I, JOSEPH BROADLEY, a citizen of the Dominion of Canada, residing at Elkhorn, in the Province of Manitoba, have invented certain new and useful Improvements in Nut-Locks; and I do hereby declare the following to be a full, clear, and exact description of the invention, such as will enable others skilled in the art to which it appertains to make and use the same.

My invention relates to that class of devices known as "nut-locks." As is well known, nuts and bolts are employed under conditions subjecting the same to jars and strains, which cause the nuts to work loose from the bolts, rendering it difficult or impossible to hold the parts together in their drawn or tightened positions. Nuts and bolts used on fish-plates for railway-joints and nuts and bolts used on agricultural machinery afford well-known examples of such conditions wherein it is difficult to hold the nuts and bolts together.

My invention has for its object to provide a simple and cheap device which will hold together a nut and bolt in whatever position they may be set, regardless of the conditions of work, jars, or strains to which the parts may be subjected. To this end I employ the device illustrated in the accompanying drawings, the novel features of which will be set forth in the following description and be particularly pointed out in the claim.

In the drawings, like letters referring to like parts throughout the several views, Figure 1 is a perspective view showing the nuts and bolts constructed in accordance with my invention and applied to the ordinary fish-plates of railway-rail joints. Figs. 2 and 3 are respectively a side elevation and an end view of the bolt; and Fig. 4 is a transverse section taken on the line X X' of Fig. 2, looking toward the right with reference to said Fig. 2. Fig. 5 is an end view of the nut; and Fig. 6 is a longitudinal section of the same, taken on the line Y Y' of said Fig. 5. Figs. 7 and 8 are end views of the nut and bolt and locking-strip or key, the former showing the said parts in their unlocked and the latter in their locked positions. Fig. 9 is a view of the locking-strip or key detached; and Fig. 10 is a view, partly in section and partly in plan, showing the parts in their locked position, some parts of the bolt being broken away, the nut being sectioned on the line Z Z' of Fig. 8.

A is an ordinary screw-threaded bolt having a reduced or flattened cam-surface $a$ cut longitudinally on the threaded portion thereof.

B is the nut, having one or more (three as shown) longitudinal grooves $b$ cut on its threaded surface.

C is a locking-strip or key of relatively-soft material as compared with the nut and bolt.

D D are the ordinary railway-rails, and E are the fish-plates used to secure the same at their joints.

The flattened cam-surface $a$ on the bolt and the grooves $b$ of the nut are so related to the locking-strip C that when the said cam-surface $a$ is turned into registration with one of the said grooves $b$ a keyway will be formed, into which the said key may be readily inserted. When, however, the bolt and nut are turned one upon the other, the said locking-strip will be carried laterally with the groove $b$ over the cam-surface $a$ and will, in virtue of its relative softness and, further, in virtue of the camming action of the said cam-surface $a$ thereon, be mashed or distorted between the threads of the bolt by a compressing action. Under this action the said locking-strip will not be cut or gouged as in other devices of this class. The portions of the key which lie in the path of the threads of the bolt will be pressed or run into the space between the threads. This gives a much tighter friction than could be otherwise attained. Furthermore, the threads of the bolt under the camming action will be thrown into engagement with the locking-strip under a gradually-increasing contact, and hence the crown of the thread will not be defaced.

The operation of this device is obvious from the foregoing description. One of the grooves $b$ of the nut being brought into registration with the cam-surface $a$ on the bolt, as shown in Fig. 7, the locking-strip or key C is inserted into the keyway formed thereby, and the parts are then turned to throw the said groove $b$ and cam-surface $a$ out of registration, as shown in Fig. 8. The parts are then frictionally locked together. When thus locked, the nut and bolt may be turned upon each other (to remove the nut) by applying sufficient wrench force to the same; but the said nut will not work loose under the action of any jars or jolts to which it is liable to be subjected in the service. It will be understood, of course, that there might be more than one cam-surface on the bolt and that the nut might have one or more grooves $b$. It is also evident that more than one strip C might be engaged at successive registrations of the different notches $b$ with the cam-surface $a$.

By actual usage I have demonstrated the efficiency of the invention herein described and claimed.

What I claim, and desire to secure by Letters Patent of the United States, is as follows:

The combination, with a screw-threaded bolt A, having a reduced cam-surface $a$, of the nut B, having one or more grooves $b$, and the locking-strip or key C, composed of relatively-soft metal, insertible into the keyway formed by said cam-surface $a$ and one of said grooves $b$ when in registration, whereby on turning the nut in the tightening action the said strip will be carried laterally over the said cam-surface on the bolt and be thereby compressed between threads of the bolt, becoming a positive friction-lock to the nut, substantially as described.

In testimony whereof I affix my signature in presence of two witnesses.

JOSEPH BROADLEY.

Witnesses:
   W. C. MILLER,
   GEO. C. WEBSTER.